(12) United States Patent
Ayrle

(10) Patent No.: US 7,309,199 B2
(45) Date of Patent: Dec. 18, 2007

(54) SPRUE DOWEL

(75) Inventor: Thomas Ayrle, Obermeitingen (DE)

(73) Assignee: Hilti Aktiengesellschaft, Schaan (LI)

( * ) Notice: Subject to any disclaimer, the term of this patent is extended or adjusted under 35 U.S.C. 154(b) by 154 days.

(21) Appl. No.: 11/116,070

(22) Filed: Apr. 27, 2005

(65) Prior Publication Data

US 2005/0244244 A1 Nov. 3, 2005

(30) Foreign Application Priority Data

Apr. 28, 2004 (DE) .................... 10 2004 020 852

(51) Int. Cl.
*F16B 39/02* (2006.01)

(52) U.S. Cl. .................. 411/82; 411/82.3; 411/258; 411/49; 411/939; 52/698

(58) Field of Classification Search .............. 411/82.3, 411/82, 939, 258, 49, 393, 356, 913; 52/698
See application file for complete search history.

(56) References Cited

U.S. PATENT DOCUMENTS

| | | | | |
|---|---|---|---|---|
| 1,802,560 A * | 4/1931 | Kerwin | ........................ | 411/423 |
| 1,971,726 A * | 8/1934 | Norwood | .................... | 411/352 |
| 2,589,484 A * | 3/1952 | Ecuer | ........................... | 411/43 |
| 2,949,142 A * | 8/1960 | Sumerak | ..................... | 411/180 |
| 4,712,957 A * | 12/1987 | Edwards et al. | ........... | 411/82.1 |
| 4,968,185 A | 11/1990 | Leibhard et al. | | |
| 4,993,900 A * | 2/1991 | Hugel et al. | ................ | 411/82.1 |
| 5,082,405 A * | 1/1992 | Witten | .......................... | 411/82 |
| 5,224,805 A * | 7/1993 | Moretti et al. | ................ | 411/30 |
| 5,275,512 A * | 1/1994 | Wright | ..................... | 405/259.6 |
| 5,391,031 A * | 2/1995 | Medal | ........................ | 411/82.5 |
| 5,634,752 A * | 6/1997 | Haage et al. | ................. | 411/82 |
| 5,730,565 A * | 3/1998 | Hein et al. | ..................... | 411/82 |
| 6,193,456 B1 * | 2/2001 | Stumpf et al. | .............. | 411/180 |
| 6,543,977 B2 | 4/2003 | Sander et al. | | |
| 6,592,286 B2 | 7/2003 | Surberg et al. | | |
| 6,705,804 B2 * | 3/2004 | Dierker | .................... | 405/259.5 |
| 7,001,124 B2 * | 2/2006 | Panasik et al. | ............... | 411/30 |
| 7,144,212 B2 * | 12/2006 | Kaye et al. | .................... | 411/30 |
| 2005/0058522 A1 * | 3/2005 | Hughes et al. | ................ | 411/82 |
| 2005/0084360 A1 * | 4/2005 | Panasik et al. | ............... | 411/44 |
| 2005/0097849 A1 * | 5/2005 | Hayes | ......................... | 52/698 |
| 2006/0029484 A1 * | 2/2006 | Panasik et al. | ............... | 411/30 |
| 2006/0165506 A1 * | 7/2006 | Panasik et al. | ............... | 411/30 |

FOREIGN PATENT DOCUMENTS

| | | |
|---|---|---|
| DE | 7024434 | 6/1970 |
| DE | 2205289 | 8/1973 |
| DE | 3107718 | 12/1981 |
| DE | 3535251 | 4/1987 |
| DE | 8810323 | 3/1989 |
| DE | 4137090 | 5/1993 |
| DE | 9312859 | 11/1994 |
| FR | 2701071 | 8/1994 |
| GB | 0831740 | 3/1960 |

* cited by examiner

*Primary Examiner*—Katherine Mitchell
(74) *Attorney, Agent, or Firm*—Abelman, Frayne & Schwab

(57) ABSTRACT

A sprue dowel has a radially projecting embeddable portion (12) and an attachment portion (21) formed as a hollow cylindrical shaft (24) provided with a plurality of spaced from each other, furrowed retaining projections (26, 27) formed on an outer circumference of the shaft and extending parallel to a longitudinal axis (25) of the sprue dowel (11).

14 Claims, 3 Drawing Sheets

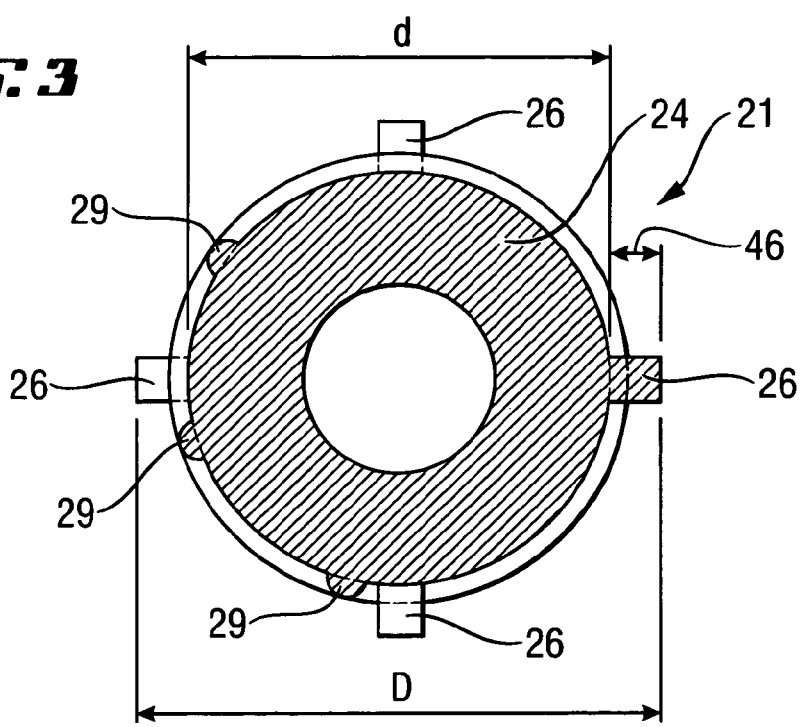
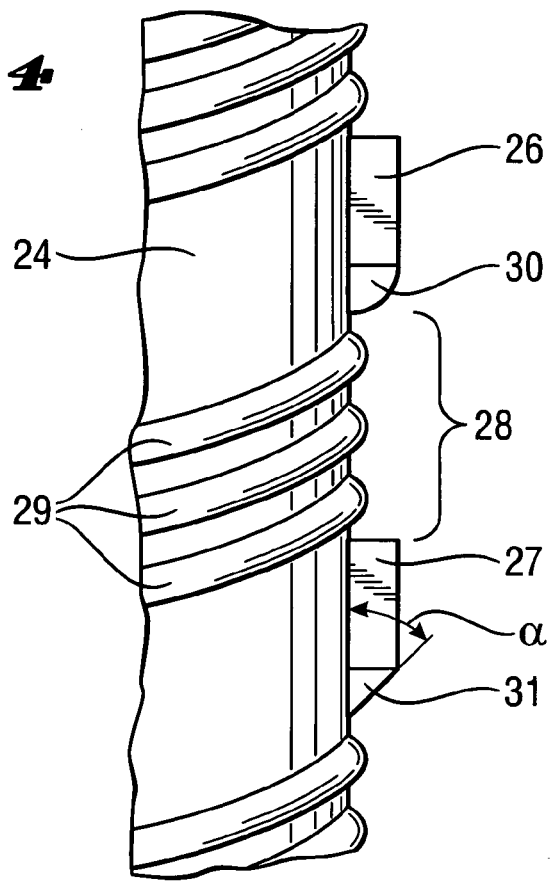

SPRUE DOWEL

BACKGROUND OF THE INVENTION

1. Field of the Invention

The present invention relates to a sprue dowel having a radically projecting, embeddable portion and an attachment portion that is formed as a hollow cylindrical shaft, and used for a mutual extension-proof connection of two solid bodies in a concrete-to-concrete connection.

2. Description of the Prior Art

For form- and forcelocking connection of a first solid body, e.g., old or mature concrete, with a free-flowing, later hardenable, second solid body, e.g., new or young concrete, a connector or a sprue dowel is secured with its attachment portion by a temporarily free-flowing, hardenable substance, e.g., grout or thermosetting resin mortar, in a blind bore formed in the first solid body, and is embedded with its radially projecting, embeddable portion in the second solid body that has not yet hardened enough.

As a connector for both solid bodies, e.g., a reinforcing iron, which is offset on the site, has its end preliminary conically upset, or is formed on the site, is used. The reinforcing iron is fixed in the blind bore in the first solid body with a temporarily free-flowing, hardenable substance. A second solid body, which is engageable with the first solid body, can be secured on the cast reinforcing iron. Alternatively to the reinforcing iron, threaded rods with a top plate screwable thereon can be used. The drawback of these solutions consists in that the connector should be held in a straight position until the temporarily free-flowing, hardenable substance completely hardens. Within this time period the connector cannot be loaded. The preliminary work, the setting process and the necessary by works are time-consuming and cost-intensive.

German Publication DE 31 07 718 A1 discloses a holding pin formed of an elongate tube with longitudinal grooves and having a tapering end. The other diameter of the pin is greater than the diameter of the blind bore. To simplify driving of the pin in, there is provided a guide plate with an opening having a diameter smaller than that of the blind bore. The tube, upon being driven in, is pressed through the opening of the guide plate and becomes secured in the blind bore by friction that is produced between the tube and the blind bore wall. The drawback of the holding pin of DE 31 07 718 A1 consists in that a guide plate is needed for setting the holding pin. Without the guide plate, in most cases, the friction between the pin and blind bore wall prevents the pin from reaching a required depth.

German Publication DE 22 05 289 A1 discloses an anchor which is formed of a plastic material and is set by using a temporarily free-flowing, hardenable substance that fills the blind bore. On its outer surface, the anchor is provided with elastically deformable longitudinal ribs. When the anchor is driven in the bore, the deformable ribs become jammed in the blind bore wall. The drawback of this anchor consists in that it can withstand only small tensioning and compression forces before the substance become hardened.

German Publication DE 100 52 810 A1 discloses a sprue dowel which is formed of a circumferentially closed, regionwise radially indented tubular section.

German Publication DE 101 03 231 A1 discloses a similar sprue dowel that in addition is provided with a conical sleeve within its embeddable portion. The sprue dowel is set in a blind bore and is adjusted. After the dowel has been set, the blind bore is filled with a temporarily free-flowing hardenable substance. The sprue dowel of 100 52 810 A1 and that of DE 101 03 231 A1 both favorably proved themselves in practice. However, these sprue dowels cannot be subjected to a load immediately after being set and before the temporarily free-flowing, hardenable substance hardens. E.g., if reinforcement elements of the second solid body, which are securable on the sprue dowel, should become accessible right away, it can lead to maladjustment of the already straightened dowel during the hardening of the temporarily free-flowing, hardenable substance.

Accordingly, an object of the invention is a sprue dowel that can be subjected to a load even before the bore is filled with a temporarily free-flowing, hardenable substance and during the hardening of the substance.

SUMMARY OF THE INVENTION

This and other objects of the present invention, which will become apparent hereinafter, are achieved, according to the invention, by providing, on the outer circumference of the shaft of the attachment section of the sprue dowel, a plurality of spaced from each other, furrowed, retaining projections extending parallel to the longitudinal axis of the sprue dowel.

The furrowed retaining projections are advantageously formed as ribs which have a sufficient hardness to be able to dig in the wall of a blind bore in the first solid body when the sprue dowel is driven thereinto. Dependent on the shape of the retaining projections, the diameter of the sprue dowel exceeds the diameter of the blind bore by from 0.5 mm to 6 mm. The retaining projections of a sprue dowel can have different excess dimensions. E.g., the excess dimension of a retaining projection can continuously increase from the free end of the attachment portion in a direction of the embeddable section. The shaft diameter is selected so that it is somewhat smaller than the blind bore diameter, so that in a set condition of the sprue dowel, an annular gap is formed between the outer surface of the shaft and the blind bore wall. With such a shape of the attachment portion of the inventive sprue dowel, the sprue dowel can be driven in the blind bore by using simple means. It can be driven manually (e.g., with a hammer) or using a mechanized impact energy (e.g., with an electrical hammer drill). This is because only the retaining projections contact the blind bore wall. During the driving of the sprue dowel in, the retaining projections dig in or furrow in the blind bore wall, whereby the sprue dowel is form- and forcelockingly retained in the blind bore. The sprue dowel can be straightened before it reaches a predetermined end position in the blind bore. The setting process is completely independent from the filling process, so that the sprue dowel can be loaded immediately after being set. The load carrying capability of the set inventive sprue dowel before filling of the blind bore with a temporarily free-flowing hardenable substance or before hardening of the same depends on the selected oversize of the retaining projections. E.g., with an oversize of 2 mm, a driven-in sprue dowel can withstand a load of 150 kg, without changing its straightened position under the load.

Because of its hollow cylindrical shape, the shaft of the attachment portion has, at its free end, an opening through which the temporarily free-flowing, hardenable substance can flow out and rise in the annular gap between the outer side or circumference of the shaft and the blind bore wall. Because the blind bore is filled from the deepest point, air is completely forced out from the blind bore, and air bubbles are eliminated to a most possible extent. The temporarily free-flowing, hardenable substance, which appears on the outer surface, serves as a backfilling aid and provides a certainty in that the blind bore is completely filled. In each blind bore, I only a necessary amount of the temporarily free-flowing, hardenable substance is injected, which is very advantageous because of high costs of the temporarily free-flowing hardenable substance. This reduces the mounting costs per blind bore.

Advantageously, the retaining projections are arranged in groups linearly one after another. This provides for an easy drive-in of the sprue dowel into a blind bore. Advantageously, adjacent retaining projections are spaced from each, forming an intermediate space therebetween, which additionally facilitates the drive-in of the sprue dowel. This is because little impact is required for driving the sprue dowel in.

Advantageously, there are provided at least three groups of retaining projection on the shaft circumference which are radially offset relative to each other. Preferably, the groups of the retaining projections are uniformly distributed over the shaft circumference, e.g., with three groups, they are offset from each other by an angle of 120° with four groups, they are offset by an angle of 90°. When the sprue dowel is driven in, the retaining projections align the dowel substantially centrally. This provides for an adequate annular gap along the entire circumference of the section of the attachment portion located in the blind bore, which insures rising of the temporarily free-flowing, hardenable substance that flows out of the sprue dowel.

Advantageously, the groups of retaining projections are axially offset relative to each other. Because not all of the retaining projections simultaneously contact the blind bore wall during the drive-in of the sprue dowel, the sprue dowel drive-in characteristics are very good, and less impact energy is needed for driving the dowel in. The retaining projections of each group, which are also axially offset relative to each other, form, as it has been discussed above, an intermediate space therebetween that serves as a guide for the rising, in the annular gap, temporarily free-flowing, hardenable, substance.

Advantageously, the retaining projections are ramp-shaped in the direction of the free end of the attachment portion. The retaining projections have regionwise a wedge shape, with a wedge angle relative to the shaft surface of from 5° to 90°. Alternatively, the retaining projections can have a concave or convex shape in the direction of the free end of the attachment portion.

Advantageously, there are provided, on the shaft of the attachment portion, helically extending guide elements. The guide elements facilitate rising of the temporarily free-flowing, hardening substance which is poured into the sprue dowel and flows out from an opening, which is provided at the free end of shaft, into the blind bore, rising in the annular gap between the outer circumference of the shaft and the blind bore wall. Advantageously, the guide elements are formed as continuous ribs.

Advantageously, the helically extending guide elements are arranged in the intermediate space between adjacent guide projections of a group. In particular, when the groups of the retaining projections are axially spaced from each other, the arrangement of the retaining projection is preferably so selected that the helically extending guide elements are arranged with the same pitch of, e.g., from 10 to 20 mm along the engagement section of the shaft.

Advantageously, a plurality of marks is provided on the shaft of the attachment portion extending substantially transverse to a longitudinal axis of the sprue dowel for indicating an engagement depth of the sprue dowel. One of the marks shows a minimal necessary engagement depth, and at least one second mark, which is axially spaced from the first mark in the direction of the embeddable portion, shows the maximal engagement depth of the sprue dowel. Preferably, further marks are provided between the first and second marks for indicating an actual or set engagement depth that lies between the maximal and minimal engagement depths. In order to prevent any obstacles to rising of the temporarily free-flowing, hardenable substance in the annular gap, the marks advantageously are formed as indentation.

Preferably, at least one recess is provided at the free-end of the attachment portion, which is formed as a slot extending transverse to the longitudinal axis of the sprue dowel. In case the opening at the free end of the attachment portion is clogged with drillings which remained in the blind bore, the temporarily free-flowing, hardenable substance, which is poured into the sprue dowel, can flow sidewise and through the side recess.

Advantageously, one further, side opening is provided in the region of the free end of the attachment portion. If the opening at the free end of the attachment portion is clogged with drillings which remained in the blind bore, the temporarily free-flowing, hardenable substance, which is poured into the sprue dowel, can flow sidewise and through the further opening. Advantageously, there are provide in the end region of the attachment portion two recesses and two side openings to insure a complete flow out of the temporarily free-flowing, hardenable substance from the sprue dowel. Advantageously, the side openings are offset 90° with respect to the extension of the recesses.

Advantageously, the sprue dowel is formed as one piece. Alternatively, the retaining projection, which form the form-locking connection can be metallurgically secured on the shaft circumference, e.g., by welding. Advantageously, the sprue dowel is produced by a sand casting process, e.g., a tempered steel casting, whereby no further working of the cast sprue dowel before its use is not necessary. In addition, the retaining projections of a sprue dowel, which is formed as a steel casting, have a sufficient hardness to dig in a wall of a blind bore of a solid body, e.g., concrete during driving of the dowel in.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

The drawings show:

FIG. 3 a cross-sectional view along line III-III in FIG. 1; and

FIG. 4 a perspective view of detail IV in FIG. 1.

In the drawings the same elements are designated with the same reference numerals.

DETAILED DESCRIPTION OF THE PREFERRED EMBODIMENT

Figure 1:
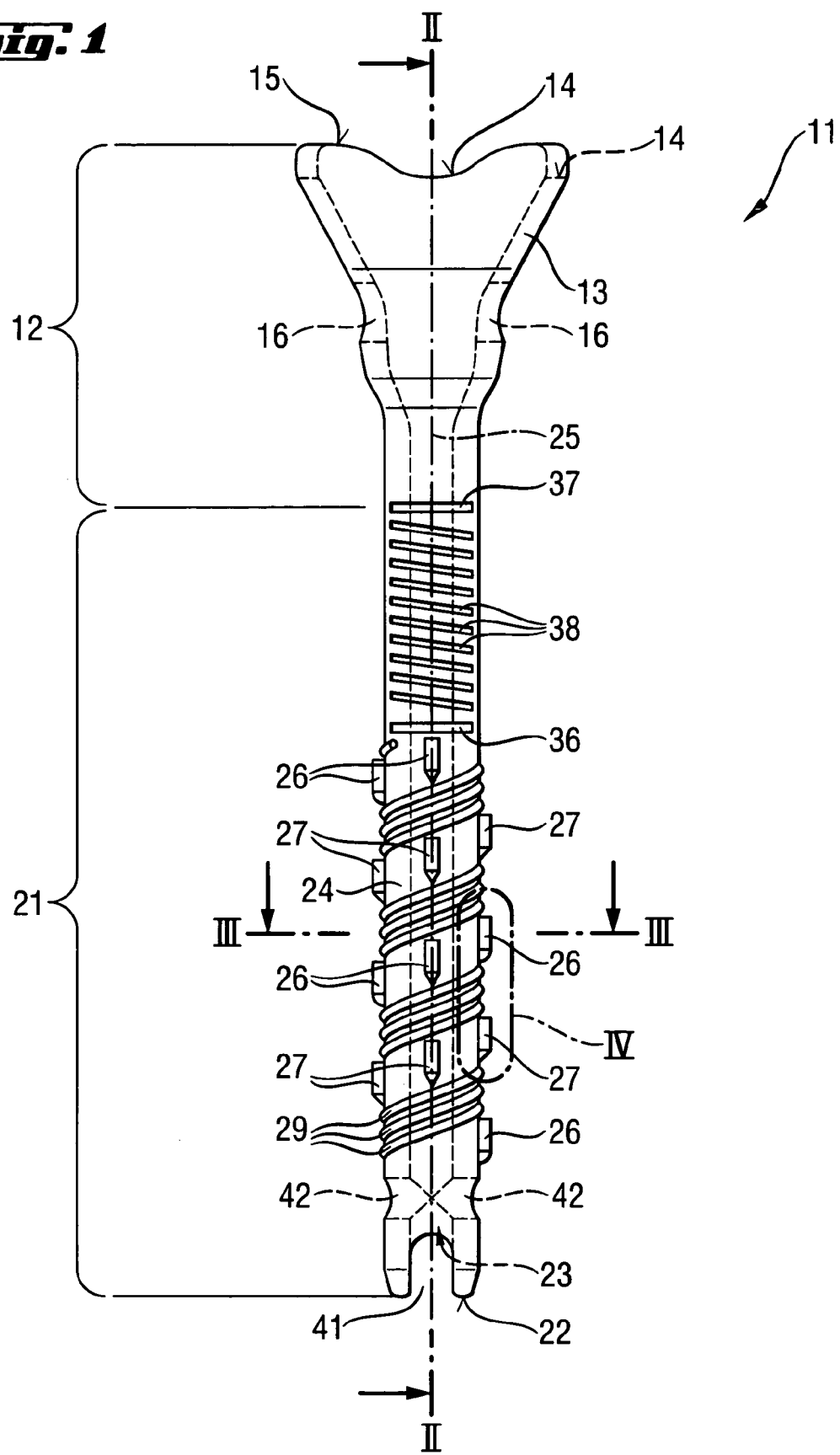
FIG. 1 a side view of a sprue dowel according to the present invention.

A sprue dowel 11 according to the present invention, which is shown in the drawings and is produced as one piece by a sand casting process, has an embeddable portion 12 and an attachment portion 21. The embeddable portion 12 has a conical sleeve 13 at the free end 15 of which, there is provided a recess 14 for receiving a reinforcing iron. In addition, there are provided, in the region of the free end 15 of the conical sleeve 13 or of the embeddable portion 12, bores 16 for insertion of a reinforcing iron therethrough.

The attachment portion 21 is formed as a hollow cylindrical shaft and is provided at its free end 22 with an opening 23 for outflow into a blind bore 3 of a temporarily free-flowing, hardenable substance 4 which is brought into the sprue dowel 11 after the dowel 11 has been driven in. At the free end 22, there is further provided two slot-shaped recesses 41 and two bores 42 offset with respect to the extent of the recesses 41 by 90°. The bores 42 provide for outflow of the temporarily free-flowing, hardenable substance 4 from the shaft 24 when the opening 23 is clogged.

On the outer surface of the shaft 24, there are provided a plurality of spaced from each other, furrowed retaining projections 26, 27 which extend parallel to a longitudinal axis 25 of the sprue dowel 11. The retaining projections 26, 27 extent linearly in groups one after another and are spaced from each other by an intermediate space 28 (see FIG. 4). On the circumference of the shaft 24, there are provided four groups of linearly arranged one after another, retaining projections 26, 27 which are offset relatively to each other axially and radially by 90°. In the intermediate space 28 between the retaining projections 26, 27, there are provided three guide elements 29 which are formed as helical continuous ribs. The separate groups of the retaining projections 26, 27 are so axially offset relative to each other that the helical guide elements 29 have a pitch of 15 mm.

As particularly shown in FIG. 4, the retaining projections 26, 27 are formed as ramp-shaped elements in direction of the free end 22 of the attachment portion 21. In the embodiment shown in the drawing, the retaining projection 26 has a convex section 30, and the retaining projection 27 has a wedge-shaped section 31 inclined to the surface of the shaft 24 at an angle α of 45°.

On the shaft 24 of the attachment portion 21, there are provided marks 36, 37 which extend transverse to the longitudinal axis 25 of the sprue dowel 11. The first mark 36, which is closer to the free end 22 of the attachment portion 21, indicates a minimal engagement depth of the sprue dowel 11 in a first solid body 1. The second mark 37, which is spaced axially from the first mark 36, indicates a maximal engagement depth of the sprue dowel 11 in the first solid body 1. Between the first mark 36 and the second mark 37, there are provided a plurality of marks 38 which are slightly inclined with respect to the first and second marks 36 and 37. The marks 38 are used for indication of the set engagement depth of the sprue dowel in the first solid body 1. The marks 36, 37, 38 are formed as indentations on the shaft 24.

Figure 2:
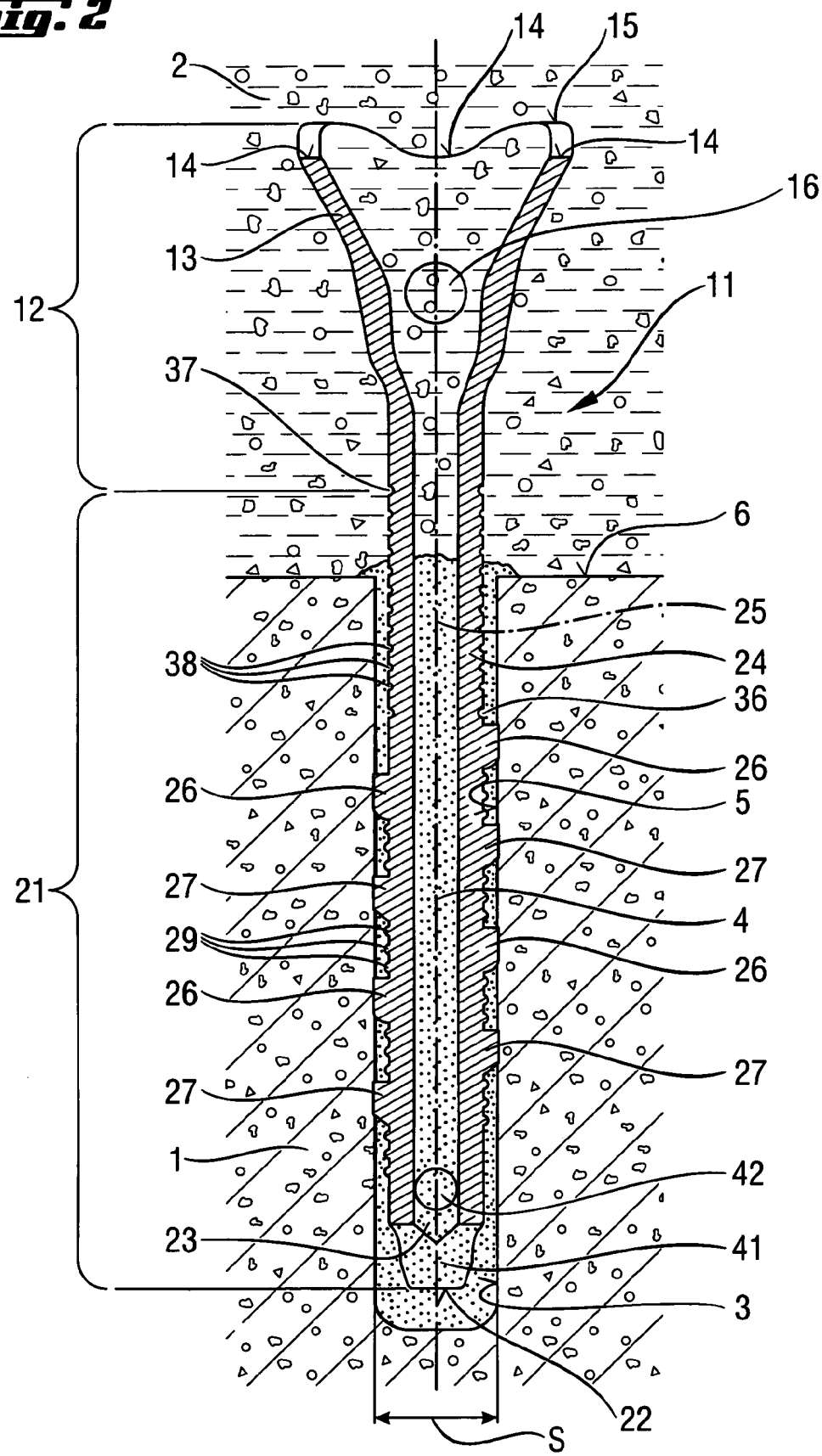
FIG. 2 a longitudinal cross-sectional view along line II-II in FIG. 1.

As shown in FIGS. 2-3, the retaining projections 26, 27 project beyond the outer circumference of the shaft 24. The amount or size of the projection is so selected that the outer diameter D of the attachment portion 21 is greater than the diameter s of the blind bore 3. The outer diameter d of the shaft 24 is smaller than the diameter s of the blind bore 3. As a result, after the sprue dowel 11 has been driven in, an annular slot is formed between the outer diameter of the shaft 24 and the wall 5 of the blind bore 3.

Below, formation of formlocking and force-locking connections between the first solid body 1 and a second solid body 2 with the inventive sprue dowel 11 will be explained in detail with reference, in particular, to FIG. 2.

Firstly, in accordance with static requirements, a plurality of blind bores 3 are formed in the solid body 1 at a predetermined distance from each other and with the same depth. Then, with the use of mechanized impact energy, the sprue dowel 11 is driven into the blind bore 3 until a predetermined engagement depth or until a desired orientation is reached. The furrowed retaining projections 26, 27 provide a form- and forcelocking or frictional connection between the sprue dowel 11 and the blind bore 3. The set sprue dowel 11 can already be subjected to a load in this mounting condition.

Through the open region of the embeddable portion 12, a temporarily free-flowing, hardenable substance 4 is introduced through the shaft 24 into the blind bore 3. The temporarily free-flowing hardenable substance 4 flows out through the opening 23, recesses 41, and bores 42 at the free end region of the attachment portion 21 and raises in the annular slot between the outer circumference of the shaft 24 and the wall 5 of the blind bore 3 up to the upper surface 6 of the first solid body 1. The rise of the temporarily free-flowing, hardenable substance 4 is facilitated by the offset arrangement of the retaining projections 26, 27 and by helically extending guide elements 29. As soon as the temporarily full-flowing hardenable substance 4 exit on the upper surface 6 of the first solid body 1, the blind bore 3 is completely filled therewith.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A sprue dowel, comprising a radially projecting, embeddable portion (12); an attachment portion (21) formed as a hollow cylindrical shaft (24) extending from said embeddable portion; a plurality of spaced from each other, furrowed retaining projections (26, 27) provided on an outer circumference of the shaft (24) and extending parallel to a longitudinal axis (25) of the sprue dowel (11), and helically extending guide elements (29) provided on the outer surface of the shaft (24); and at least one bore (42) formed in said hollow cylindrical shaft (24) in a direction traversing said longitudinal axis (25) and in a region of a free end (22) of the attachment portion (21).

2. A sprue dowel according to claim 1, wherein the retaining projections (26, 27) are arranged in groups along said longitudinal axis (25).

3. A sprue dowel according to claim 2, wherein adjacent retaining projections (26, 27) are spaced from each other by an intermediate space (28).

4. A sprue dowel according to claim 2, wherein the plurality of retaining projections (26, 27) comprises at least three groups of retaining projections radially offset relative to each other.

5. A sprue dowel according to claim 4, wherein the at least three groups of retaining projections are axially offset relative to each other.

6. A sprue dowel according to claim 1, wherein the retaining projections (26, 27) are formed as substantially sloped-shaped elements in a direction of a free end of the attachment portion (21).

7. A sprue dowel according to claim 1, wherein the guide elements (29) are formed as continuous ribs.

8. A sprue dowel according to claim 1, wherein the helically extending guide elements (29) are provided in an intermediate space (28) between adjacent retaining projections (26, 27) of at least one group of retaining projections (26, 27).

9. A sprue dowel according to claim 1, further comprising a plurality of marks (36, 37, 38) provided on the shaft (24) of the attachment portion (21) and extending substantially transverse to the longitudinal axis (25) of the sprue dowel (11) for indicating an engagement depth of the sprue dowel (11).

10. A sprue dowel according to claim 9, wherein the marks (36, 37, 38) are formed as indentations.

11. A sprue dowel according to claim 1, wherein the attachment portion (21) has at least one recess (41) at the free end (22) thereof.

12. A sprue dowel according to claim 1, wherein the sprue dowel (11) is formed as a one-piece part.

13. A sprue dowel according to claim 12, wherein the sprue dowel (11) is formed by a sand casting process.

14. A sprue dowel according to claim 1, wherein the retaining projections (26, 27) are formed as curved-shaped elements in a direction of the free end of the attachment portion (21).

* * * * *